(12) United States Patent
Shoykhet et al.

(10) Patent No.: US 11,743,308 B1
(45) Date of Patent: Aug. 29, 2023

(54) EFFICIENT MEDIA STORAGE FOR USE IN MEDIA STREAMING

(71) Applicant: AUDACY OPERATIONS, INC., Philadelphia, PA (US)

(72) Inventors: Vitaly Shoykhet, Broomfield, CO (US); Brian Scott Bosworth, Edgewater, MD (US); Jeremiah Matthew Jones, Jacksonville, FL (US); Justin Byron Filion, Washougal, WA (US); John William Morris, IV, Washougal, WA (US)

(73) Assignee: AUDACY OPERATIONS, INC., Philadelphia, PA (US)

( * ) Notice: Subject to any disclaimer, the term of this patent is extended or adjusted under 35 U.S.C. 154(b) by 0 days.

(21) Appl. No.: 17/867,521

(22) Filed: Jul. 18, 2022

(51) Int. Cl.
| | |
|---|---|
| *G06F 12/08* | (2016.01) |
| *H04L 29/06* | (2006.01) |
| *H04N 21/6375* | (2011.01) |
| *H04N 21/6587* | (2011.01) |
| *H04L 65/61* | (2022.01) |
| *G06F 12/0802* | (2016.01) |

(52) U.S. Cl.
CPC .......... *H04L 65/61* (2022.05); *G06F 12/0802* (2013.01); *H04N 21/6375* (2013.01); *H04N 21/6587* (2013.01)

(58) Field of Classification Search
CPC ..... H04L 65/00; H04L 65/1059; H04L 65/40; H04L 65/60; H04L 65/61; H04L 65/613; H04N 21/637; H04N 21/6375; H04N 21/6377; H04N 21/6433; H04N 21/65; H04N 21/658; H04N 21/6587; G06F 12/02; G06F 12/06; G06F 12/08; G06F 12/0802–0893

See application file for complete search history.

(56) References Cited

U.S. PATENT DOCUMENTS

| | | | |
|---|---|---|---|
| 10,986,379 B2 | 4/2021 | Green et al. | |
| 11,347,571 B1 * | 5/2022 | Paduroiu | ................. G06F 9/542 |
| 11,347,747 B1 * | 5/2022 | Paduroiu | ............. G06F 16/2246 |

(Continued)

OTHER PUBLICATIONS

Tran et al., "Bitrate Adaptation for Video Streaming Services in Edge Caching Systems" IEEE Access (Year: 2020).*

*Primary Examiner* — Boris D Grijalva Lobos
(74) *Attorney, Agent, or Firm* — Morgan, Lewis & Bockius LLP

(57) ABSTRACT

The method for storing streaming media includes receiving, from a user device, a request to navigate to a requested time of a media stream. The method also includes determining whether a block of media segments that have a time interval that overlaps with the requested time is stored at the server. The method also includes retrieving the block of media segments from long-term memory in accordance with a determination that the block of media segments is not stored at the server. The method also includes traversing the block of media segments that have a time interval that overlaps with the requested time of the media stream to seek and identify a media segment corresponding to the requested time of the media stream. The method also includes streaming a media stream to the user device that begins at the media segment corresponding to the requested time of the media stream.

19 Claims, 6 Drawing Sheets

(56) References Cited

U.S. PATENT DOCUMENTS

| | | | |
|---|---|---|---|
| 2009/0313330 A1* | 12/2009 | Sakamoto | H04N 21/8456 709/204 |
| 2015/0039714 A1* | 2/2015 | Venturi | H04N 21/44004 709/213 |
| 2022/0103890 A1* | 3/2022 | Pacino | H04N 21/8456 |

* cited by examiner

FIG. 2A

Forego retrieving the block of media fragments from long term memory in accordance with a determination that the block of media fragments that have a time interval that overlaps with the requested time of the media stream is stored at the short-term memory at the server

206

Traverse the block of media fragments that have a time interval that overlaps with the requested time of the media stream to seek and identify a media fragment corresponding to the requested time of the media stream

207

Stream a media stream to the user device that begins at the media fragment corresponding to the requested time of the media stream

EFFICIENT MEDIA STORAGE FOR USE IN MEDIA STREAMING

TECHNICAL FIELD

The disclosed implementations relate generally to media streaming. In particular, the disclosed implementations relate to media storage (e.g., livestream media, pre-recorded media, etc.).

BACKGROUND

In today's age, it is becoming increasingly common to stream media (e.g., music, television, etc.) rather than playing it locally (e.g., on a CD player, a DVD player, etc.). One of the many advantages of streaming media is that is allows a user to access a media library much larger than the user might otherwise have access to. For example, video streaming services grant users access to thousands of different television shows and films. Likewise, audio streaming services allow their users to choose from millions of different artists and albums.

Though media for streaming need not be stored on a user's device for the user to access it, the media does need to be stored somewhere. And, though the price of digital storage mediums (e.g., computer memory) has decreased significantly over time, high-capacity servers are still expensive. Considering the number of users interested in streaming media, as well as the massive amount of media available for streaming to them, the costs quickly add up.

Accordingly, there is a need for a more efficient method of storing, loading, and streaming media.

SUMMARY

The following provides a description of methods, electronic devices, and non-transitory, computer-readable mediums for navigating a media stream. Storing media between a high-speed server and a slower, but cheaper long-term memory allows for a more cost-effective means of streaming media without significantly sacrificing speed and the user experience.

Some implementations provide a method for storing streaming media. The method includes performing operations at a server while simultaneously receiving and streaming a plurality of media streams to a plurality of user devices. Each respective media stream of the plurality of media streams comprises a plurality of media segments, and each media segment corresponds to a time-divided portion of a respective media stream. The operations include grouping subsets of temporally adjacent media segments for each media stream of the plurality of media streams into blocks of media segments, with each block of media segments corresponding to a time interval of the respective media stream. The operations also include, for each block of media segments having a time interval of a respective media stream that does not overlap with a time of a currently-streaming media stream, storing the respective block of media segments in long-term memory that is separate and distinct from memory at the server. The operations also include receiving, from a respective user device of the plurality of user devices, a request to navigate from a current time of the media stream to a requested time of the media stream. The operations also include determining whether a block of media segments that have a time interval that overlaps with the requested time of the media stream is stored at the server. The operations also include retrieving the block of media segments from long-term memory in accordance with a determination that the block of media segments that have a time interval that overlaps with the requested time of the media stream is not stored at the server. The operations also include foregoing retrieving the block of media segments from long-term memory in accordance with a determination that the block of media segments that have a time interval that overlaps with the requested time of the media stream is stored at short-term memory at the server. The operations also include traversing the block of media segments that have a time interval that overlaps with the requested time of the media stream to seek and identify a media segment corresponding to the requested time of the media stream. The operations also include streaming a media stream to the user device that begins at the media segment corresponding to the requested time of the media stream.

In some embodiments, the method further includes, prior to retrieving the block of media segments from long-term memory, quantizing the requested time into a particular unit of time, wherein each unit of quantized time corresponds to the time interval for the blocks of media segments, and determining whether a block of media segments that have a time interval that corresponds to the particular unit of time is stored at the server. In some embodiments, the method further includes determining whether a respective media segment temporally subsequent to a currently-streaming media segment is stored at the server, and, in accordance with a determination that the respective media segment temporally subsequent to a currently streaming media segment is not stored at the server, retrieving a block of media segments that includes the temporally subsequent respective media segment from long-term memory.

In some embodiments, the method further includes determining whether a respective block of media segments that is not currently streaming to a respective user meets deprecation criteria, and in response to a determination that the respective block of media segments meets deprecation criteria, removing the block of media segments from the server. In some embodiments, determining whether a respective block of media segments that is not currently streaming to a respective user meets deprecation criteria includes applying a criterion that is met when a previously initiated timer associated with the respective block of media segments expires after a predetermined amount of time since any media segments of the block of media segments was streamed to a respective user.

In some embodiments, the media associated with each media segment of the plurality of media segments is of the same or substantially the same length. In some embodiments, the media associated with each media segment of the plurality of media segments is no more than ten seconds long. In some embodiments, the media associated with each media segment of the plurality of media segments is of the same size. In some embodiments, the method further includes displaying, at the user device, an indication of the current time of the media stream, and displaying, at the user device, an option to navigate from the current time of the media stream to the requested time of the media stream. In some embodiments, retrieving the block of media segments from long-term memory includes removing, in accordance with a determination that there is not sufficient free space in the server for storage of the media segment, a pre-stored block of media segments, wherein a timer associated with the pre-stored block of media segments will expire before any other timer associated with respective other blocks of media segments stored in the server.

In some embodiments, the predetermined amount of time is based on a length of the media segment. In some embodiments, the server comprises a server in a content distribution network (CDN). In some embodiments, the requested time of the media stream is an earlier time of the media stream relative to the current time of the media stream. In some embodiments, the requested time of the media stream is a later time of the media stream relative to the current time of the media stream. In some embodiments, the media stream comprises audio media. In some embodiments, the media stream comprises video media. In some embodiments, the media stream comprises a live stream.

Some implementations provide an electronic device that includes one or more processors and memory storing one or more programs. The one or more programs includes instructions, which, when executed by the one or more processors, cause the electronic device to perform the method of any of the aforesaid embodiments. Other implementations provide a non-transitory, computer-readable medium that stores one or more programs. The one or more programs include instructions, which, when executed by one or more processors of an electronic device, cause the electronic device to perform the method of any of the aforesaid embodiments.

BRIEF DESCRIPTION OF THE DRAWINGS

The implementations disclosed herein are illustrated by way of example, and not by way of limitation, in the figures of the accompanying drawings. Like reference numerals refer to corresponding parts throughout the drawings.

FIGS. 2A-2B illustrate a method of storing streaming media, in accordance with some implementations.

DETAILED DESCRIPTION

Figure 1A:
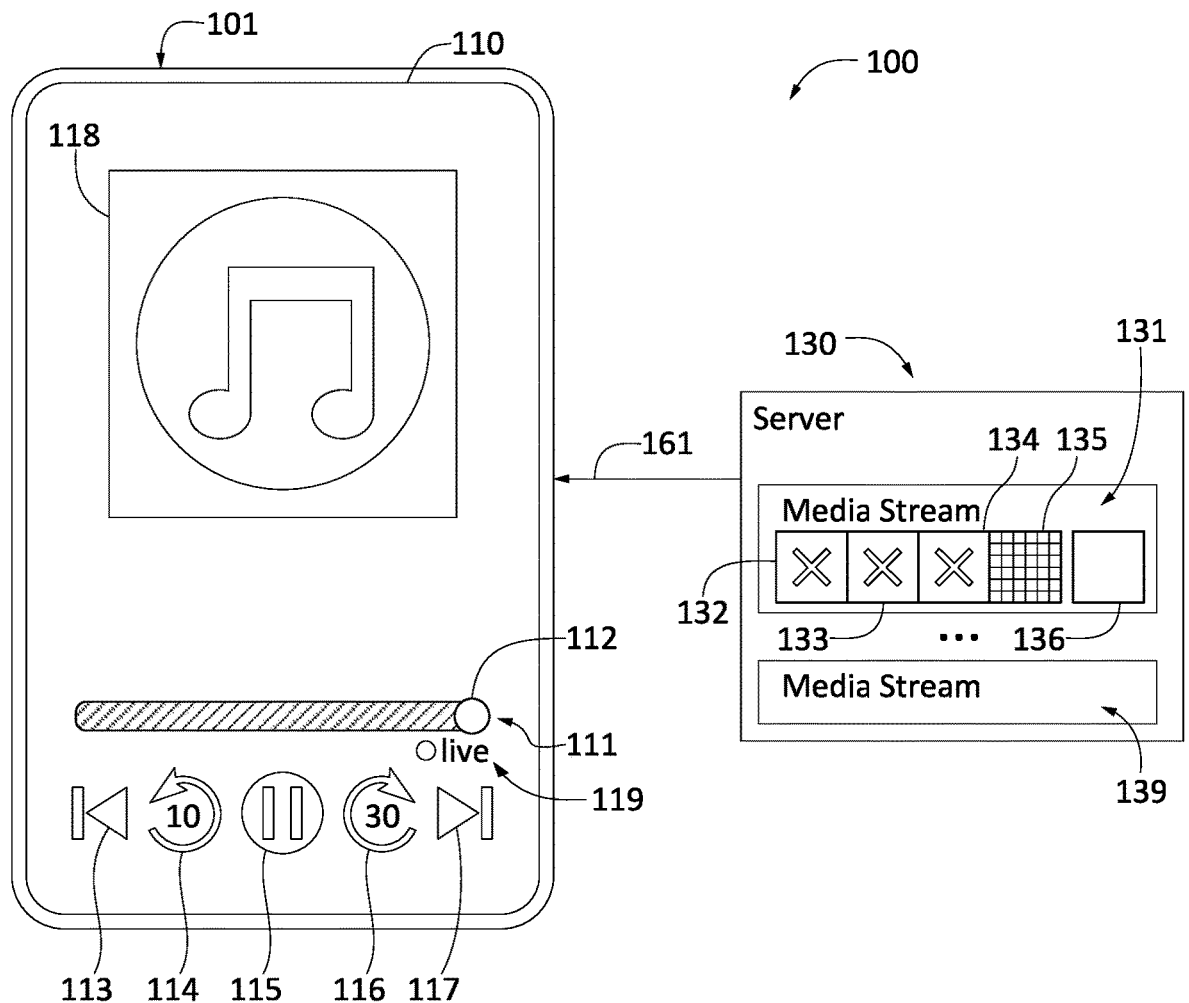
FIGS. 1A-1D illustrate a server streaming a media stream to a user device, in accordance with some implementations.

FIGS. 1A-1D illustrate a system 100 for implementing one or more embodiments of the inventions described herein. The system 100 may include a user device 101, a server 130, and/or long-term memory 150.

The system 100 may include one or more computers having one or more processors and memory (e.g., one or more non-volatile storage devices) to stream live and time-shifted audio content to a client device according to at least one embodiment of the present invention. Memory, or a computer-readable storage medium of memory, may store programs, modules and data structures, or subsets thereof, for a processor to control and run the various systems and methods disclosed herein. The system 100 may include a non-transitory computer readable storage medium having stored thereon computer-executable instructions which, when executed by a processor, perform one or more of the methods disclosed herein.

In the discussion that follows, a client device (e.g., user device 101) that includes a processor, a display (e.g., user display 110) and an audio output device is described. It should be understood, however, that the client device optionally includes one or more other physical user-interface devices, such as a physical keyboard, a touch-sensitive display, a mouse, a joystick, a microphone, and a remote control.

Server 130 is referenced in the below description. It will be understood that a server may refer to a computing device that provides data to other computing devices including, but not limited to, other servers and client computing devices. The server 130 may transmit the data over a local area network (LAN) or a wide area network (WAN), over the internet, as well as among other data transmission mediums. The server 130 may provide different services described herein and include software capable of providing those services. The server 130 may also host software suitable for video/radio broadcasting and streaming media streams.

The term "streaming" is consistently used as well; it will be understood that streaming can refer to either the steady, continuous flow of data transmission or reception over a computer network. The terms "stream" and "transmit" may be used interchangeably throughout the specification. Furthermore, as used herein, streaming may refer to the server 130 streaming media directly to the user device 101. Streaming may also refer to manifest-based streaming, wherein the server 130 sends a manifest file to the user device 101 that includes the location of at least a portion of a media stream (e.g., a media block, a media segment). After receiving the manifest file, the user device 101 may then download the portion of the media stream from the location indicated in the manifest file (e.g., server 130, a cloud storage server).

Turning now to FIG. 1A, the server 130 may stream a media stream 131 to a user device 101. This is illustrated by the arrow 161 pointing from the server 130 to the user device 101. The stream can be a livestream, meaning a stream of media that is broadcast in real-time (i.e., at the same time it is being recorded). For example, the livestream indicator 119 suggests the server 130 is currently streaming a livestream to the device 101. (Contrast this with the lack of a livestream indicator 119 in location 121 of FIG. 1B.) However, the stream need not be a livestream. For example, the stream can be a pre-compiled playlist, podcast, or a television show, or any sort of pre-recorded media.

The user device may include a display 110. The display 110 may include a media graphic 118 representative of the content from the livestream. For example, for audio media (e.g., music), the media graphic 118 can be album art or an image of a performer. As another example, for video media (e.g., television, film, videoblog, etc.), the media graphic 118 can be a video player.

The display 110 can also include a scrubber bar 111 and a cursor 112. The cursor 112 may travel along the length of the scrubber bar 111 as media is streamed or played. For example, when the device begins streaming or playing media, the cursor 112 is located at the leftmost portion of the scrubber bar 111. And when the device finishes streaming or playing the media, the cursor 112 is at the rightmost portion of the scrubber bar 111. Accordingly, the scrubber bar 111 and the cursor 112 may together indicate how much of the media has already streamed or played, and how much of the media remains to be streamed or played.

The cursor 112 may remain at the rightmost portion of the scrubber bar 111 while a media livestream is streamed to the device 101. The cursor 112 may not be displayed while a media livestream is streamed to the device 101. The display 110 may include a livestream indicator 119 that indicates when a media livestream is streamed to the device 101. The display 110 may not include a livestream indicator 119 when a media livestream is not streamed to the device (e.g., the device is not streaming media, the device is streaming non-live media, etc.). For example, as noted above, the display 110 of FIG. 1B does not include a livestream indicator 119 at location 121 of the display 110—suggesting the device 101 may not currently streaming live media.

The scrubber bar 111 may allow a user to navigate the media. For example, as discussed below with respect to FIG. 1B, the user can select (e.g., tap, click, press, etc.) the cursor 112 and then drag the cursor 112 to a new position on the scrubber bar 111. For further discussion of this functionality, see the below paragraphs describing FIG. 1B.

The display 110 may also include a rewind button 113, a skip-back button 114 (e.g., a skip-back-ten-seconds button), a pause button 115, a skip-forward button 116 (e.g., a skip-forward-thirty-seconds button), and a fast-forward button 117. The user can select (e.g., tap, click, press, etc.) the skip-back button 114 or the skip-forward button 116 in order to navigate from a current time in the media to another time in the media. For example, as illustrated in FIG. 1A, the skip-back button 114 is a skip-back-ten-seconds button. This is indicated by the number "10" in the middle of the skip-back button 114. Accordingly, the user can select the skip-back button 114 of FIG. 1A in order to navigate to a time in the media that is ten seconds earlier than the currently streaming or playing time.

The rewind button 113 and the fast-forward button 117 may allow the user to navigate to other media (e.g., media stream 139, another song, another episode, another album, etc.) that is, respectively, before or after the current media. The rewind button 113 and the fast-forward button 117 may allow the user to navigate to other time(s) in the media currently streaming or playing. For example, if the user holds (e.g., long-presses) the rewind button 113 or the fast-forward button 117, the cursor 112 moves to the left or the right, respectively, and streaming or playing media adjusts accordingly (e.g., by streaming or playing from a position earlier or later, respectively, in the media). The pause button 115 may allow the user to pause the currently streaming or playing media. After a user selects (e.g., taps, clicks, presses, etc.) the pause button 115, the display 110 may replace the pause button 115 with a play button that allows the user to continue streaming or playing the media.

The server 130 may store one or more media streams, such as media streams 131 and 139. Each media stream may be partitioned into media blocks, such as media blocks 132, 133, 134, and 135 of media stream 131. The media blocks may be partitioned by time intervals (e.g., six-minute blocks, ten-minute blocks, one-hour blocks, etc.). Each media block may be further partitioned into media segments, represented by the small squares that make up media block 135. By contrast, media blocks 132, 133, and 134 instead each contain an "X" to indicate that the blocks are not currently stored at the server 130.

As compared to the media blocks, the media segments may correspond to relatively small time intervals (e.g., six-second intervals, ten second intervals, etc.) of a media stream. For example, a media stream can be pieced into six-second media segments, such that a two-hour media stream would include twelve-hundred media segments. The server may store temporally adjacent media segments in the aforementioned media blocks. Accordingly, in some embodiments, each media block corresponds to a time interval of the media stream with which it is associated (e.g., a first fifteen-minute time interval, a second fifteen-minute time interval, a third fifteen-minute time interval, etc.). For example, in embodiments where each media block corresponds to fifteen minutes' worth of media, the last media block (e.g., media block 135) of a media stream (e.g., media stream 131) corresponds to the last fifteen minutes of said media stream.

As indicated above, in some embodiments, the server 130 does not store every block associated with a given media stream. This is illustrated in FIG. 1A, for example, by each "X" in media blocks 132, 133, and 134 of media stream 131. The server 130 may not store every block (e.g., blocks 132-135) of a media stream (e.g., media stream 131) because the server may not have the memory capacity necessary to store every block of the media stream (e.g., because the server has limited space). The server 130 may not store every block of the media stream because it would be inefficient to store every block of the media stream (e.g., because only some of the blocks of the media stream are being accessed). There may also be yet other reasons for which the server does not store every block of the media stream.

Figure 1B:
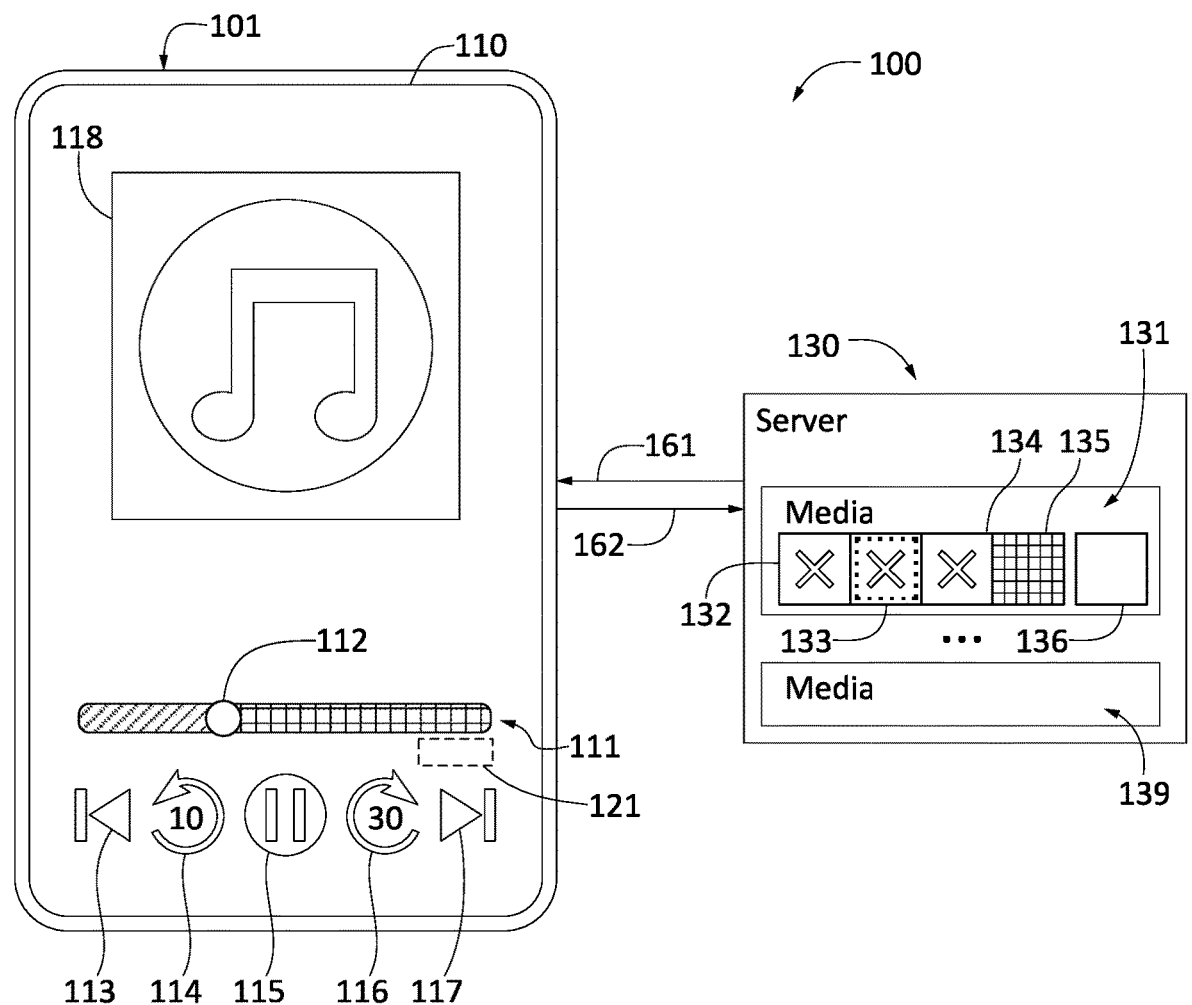

As illustrated in FIG. 1B, the user device 101 may receive a navigation request input from a user to play the media stream from a requested time.

After receiving the navigation input request from the user, the user device 101 may send the navigation request to the server 130. This is depicted by the arrow 162 pointing from the user device 101 to the server 130. The navigation request may include a request to navigate to a requested time in the media stream selected by the user. The navigation request may include the requested time (e.g., four minutes and twenty-two seconds after the beginning of the media stream).

After the server 130 receives the navigation request from the user device 101, the server may determine whether the respective media block corresponding to the requested time in the media stream is stored at the server 130. Determining whether the respective media block corresponding to the requested time in the media stream is stored at the server 130 may include determining whether the media block and/or media segment associated with the requested time is stored at the server 130.

If it is determined that the respective media block corresponding to the requested time of the media stream is stored at the server 130, then the server 130 streams the respective media block corresponding to the requested time of the media stream to the user device 101. To identify the media segment that corresponds to the requested time in the media stream, the server 130 may traverse the media block 133 to locate the media segment. After the server 130 locates the media segment, the server 130 may then stream the media stream 131 to the user device 101 from the requested time in the media stream 131.

However, it may be determined that the respective media block corresponding to the requested time of the media stream is not stored at the server 130. For example, as illustrated in FIG. 1B, the requested time in the media stream corresponds with media block 133 in the media stream 131. This is indicated by the dotted line along the inner border of the media block 133. As noted above, the "X" in media block 133 indicates that the data associated with the media block 133 is not stored at the server 130.

Determining whether the respective media block corresponding to the requested time of the media stream is stored at the server 130 may include determining the media block that corresponds with the requested time. This determination may include quantizing the requested time, where "quantizing" describes an operation (e.g., a rounding-down operation based on the size of the media blocks) to identify the respective media block with a time period that overlaps with the requested time. For example, each media block may correspond to fifteen minutes of a media stream. So, a first media block may refer to a time period of zero to fifteen minutes in the mediate stream, the second media block may refer to a time period of fifteen minutes to thirty minutes in the media stream, and so on. Assuming the requested time, for example, is twenty minutes and twenty seconds, the requested time is quantized, or rounded, to fifteen minutes (e.g., the five minutes and twenty seconds are disregarded).

Given the size of the media blocks, each requested time that quantizes to fifteen minutes (e.g., requested times that fall within fifteen minutes through twenty-nine minutes and fifty-nine seconds) corresponds to the second media block.

Figure 1C:
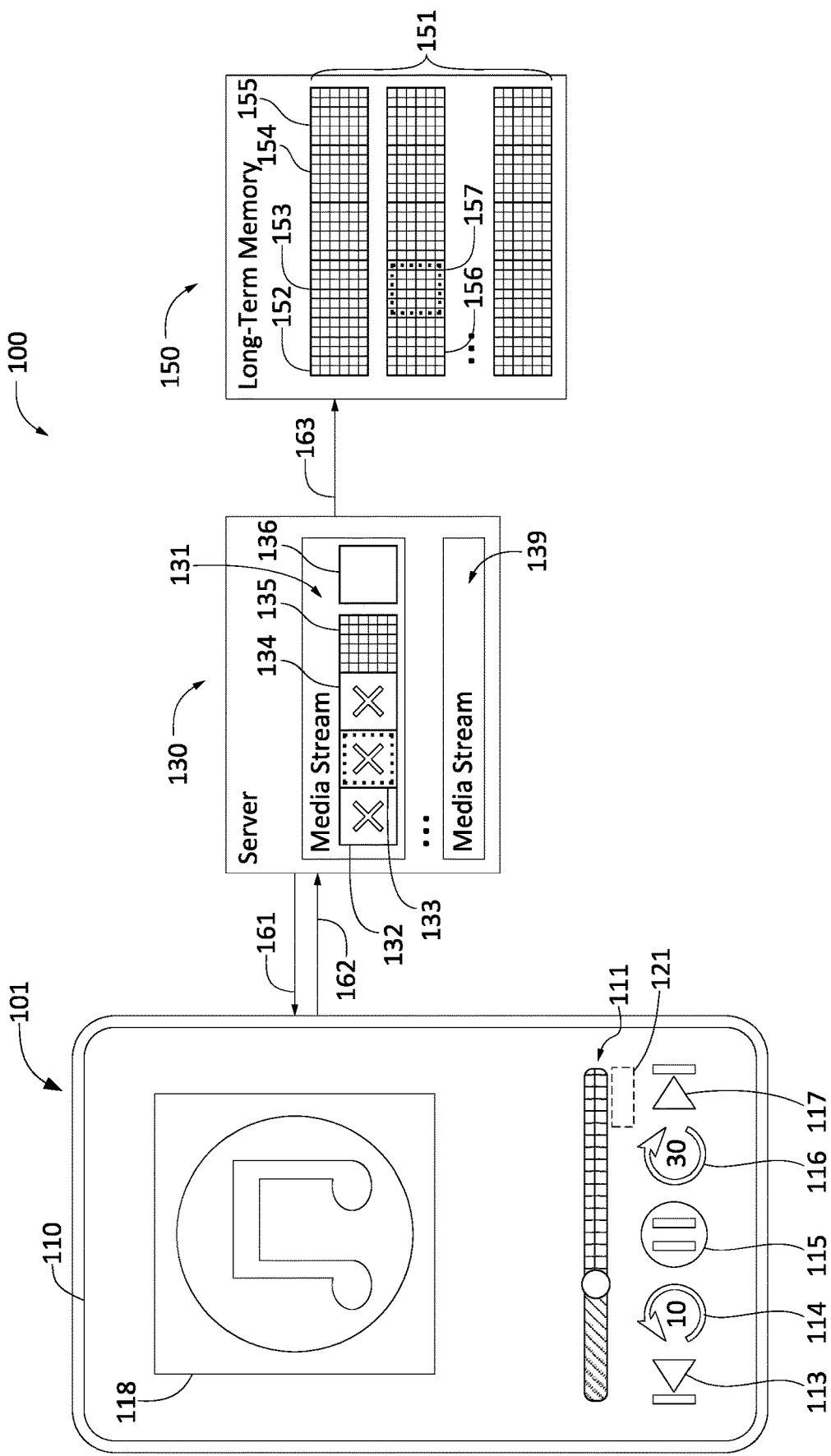

As illustrated in FIG. 1C, after it is determined that the media block 133 is not stored at the server 130, the media block 133 may then be retrieved from long-term storage 150. As used herein, "long-term storage" refers generally to high-capacity storage, such as hard-disk drives (HDD), solid-state drives (SSD), or flash memory (e.g., NAND flash). Typically, the cost per bit is lower for high-capacity storage such as the aforenoted solutions; however, the read and write speeds of said storage is also lower. In some examples, the server 130 can request (e.g., via Wi-Fi) the media block 133 from the long-term storage 150. This is depicted by the arrow 163 pointing from the server 130 to the long-term storage 150. As noted above, media blocks may not be stored at the server 130 for various reasons—including storage constraints. The long-term storage 150 may be larger than the server 130. Accordingly, the long-term storage 150 can act as supplemental storage to the server 130, storing a plurality 151 of media blocks that includes media blocks 152-157.

Retrieving data from the long-term storage 150 may be slower than retrieving data from the server 130 due to the need to transmit a request to long-term storage 150, await long-term storage 150 accessing the respective media blocks and transmitting the respective media blocks back to the server 130. Thus, only the most relevant media blocks (e.g., currently streaming media blocks, soon-to-stream media blocks, etc.) may be stored at the server 130 to maximize efficiency while still working within the aforenoted storage constraints.

After the media block 133 is requested from the long-term storage 150, the long-term storage 150 may locate the requested media block 133. This is indicated in FIG. 1C by the dotted line around the inner border of media block 157. The long-term storage may locate the requested media block 133 by an identifier tag sent from the server 130 (e.g., a tag stored in the metadata 136 of the media stream 131). As depicted in FIG. 1C, media block 157 of the long-term memory 150 corresponds to the requested media block 133.

Figure 1D:
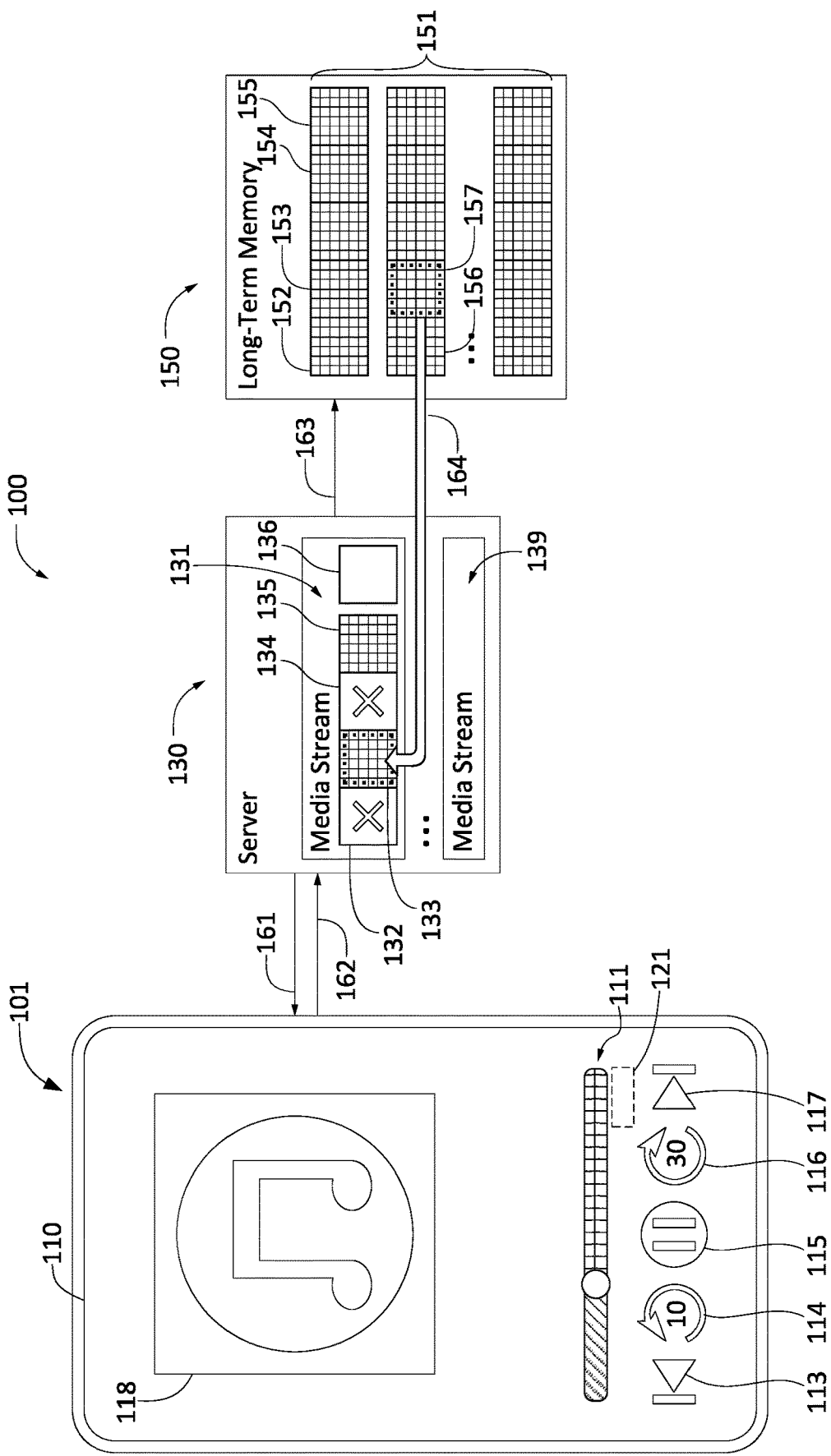

As depicted in FIG. 1D, after the requested media block 133 is located, the long-term storage 150 may transmit the media block 157 corresponding to media block 133 back to the server 130. In FIG. 1D, this is depicted by the arrow 164 pointing from the long-term storage 150 to the server 130. After the media block 157 is sent back to the server 130, the data of the media block 157 may be stored in the server 130. This is depicted in FIG. 1D by the lack of an "X" at media block 133. Accordingly, the data of media block 157 corresponds to the requested media block 133. Thus, it is loaded into the appropriate location in the server 130.

When a media block is stored on the server 130, the server 130 may set a timer associated with the media block. The timer (e.g., a count-up timer) may be used to determine how long it has been since the media block was stored on the server 130 or how long it has been since the media block was accessed to host a media stream to any user. The timer (e.g., a count-down timer) may be used to determine whether the media block is becoming less relevant and should be removed from the server. For example, if the timer has expired (e.g., counted down to zero, or exceeded a predetermined amount of time), then the media block may be removed from the server. If the server does not have sufficient space to store another media block, then the timer may be used to determine whether the media block meets deprecation criteria. For example, the media block may meet deprecation criteria if the timer associated with the media block indicates that the media block is older than each other media block on the server. For example, the timer might indicate the media block is older than each other media block on the server by being at a higher count than each other media block on the server. The timer may be reset each time the server 130 streams media from the media block to a user device (e.g., the user device 101).

Figure 2A:
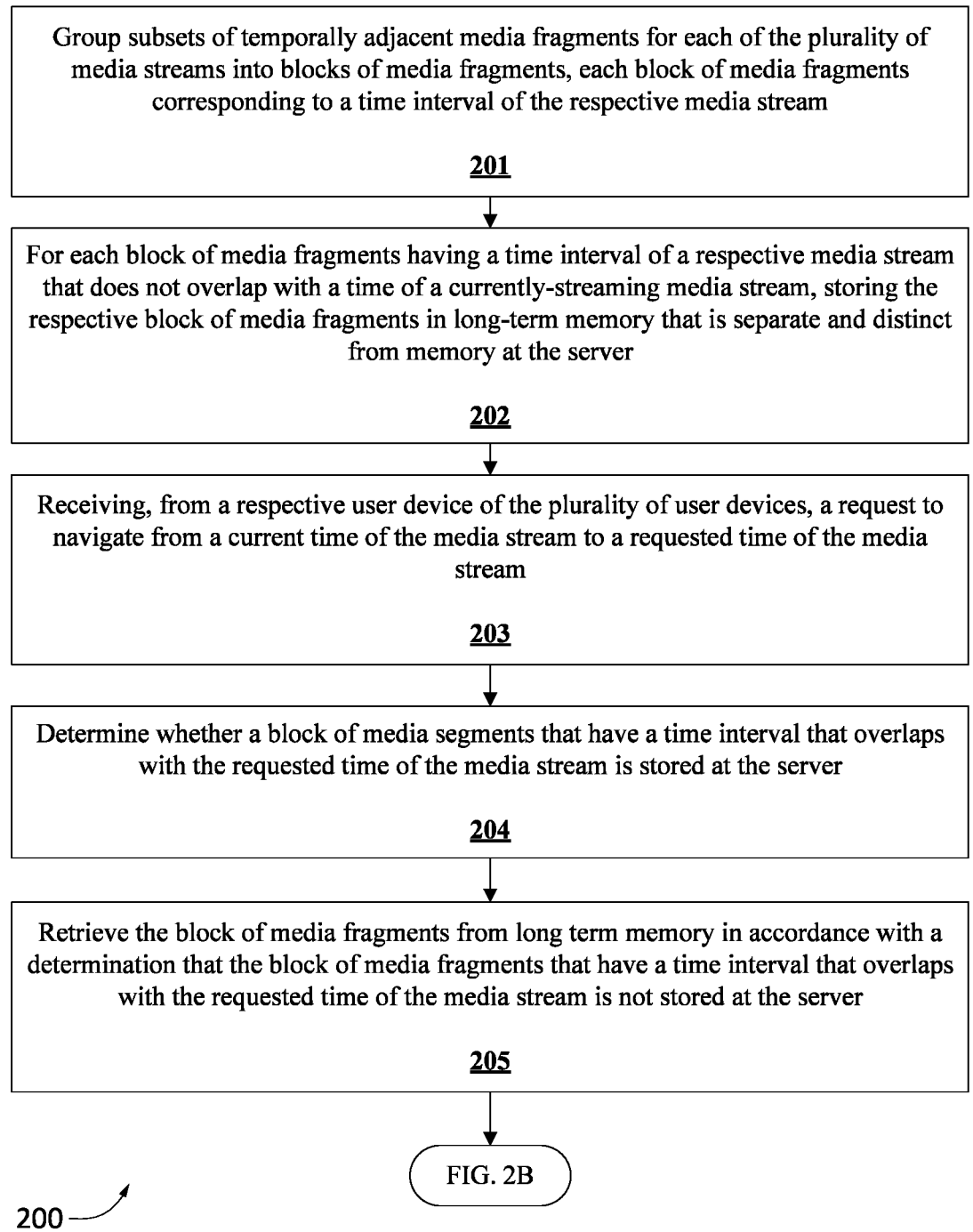

FIGS. 2A-2B illustrate a method 200 of storing streaming media, in accordance with some implementations. As illustrated in FIG. 2A, in some embodiments, the method 200 includes grouping (201) subsets of temporally adjacent media segments for each media stream of a plurality of media streams into blocks of media segments. In some embodiments, each block of media segments corresponds to a time interval of the respective media stream. For example, the first media segment might correspond to the first ten seconds of the respective media stream; the second media segment, the next ten seconds; and so on.

In some embodiments, the media stream includes audio media. For example, the media stream might include a film score, such as in a feature film. As another example, the media stream might include music, such as in an album. As yet another example, the media stream might include audible dialogue, such as in a podcast.

In some embodiments, the media stream includes video media. For example, the media stream might include a slideshow, such as in a presentation. As another example, the media stream might include album art, such as for an album. As yet another example, the media stream might include a film, such as for a movie.

In some embodiments, the media stream includes a live stream. For example, the media stream can include a radio broadcast, a news broadcast, or a broadcast of a sporting event.

In some embodiments, each media segment of the plurality of media segments is of the same length. For example, referring to FIG. 1D, each of the media segments of media block 135 can be the same length (e.g., as measured in seconds). In some embodiments, each media segment of the plurality of media segments is no more than ten seconds long. For example, each of the media segments of media block 135 can be less than or equal to ten seconds long (e.g., five second segments of a song, six second segments of a show, etc.). In some embodiments, each media segment of the plurality of media segments is of the same size. For example, each of the media segments of media block 135 can be of the same size (e.g., as measured in bytes).

In some embodiments, the method 200 includes storing (202), for each block of media segments having a time interval of a respective media stream that does not overlap with a time of a currently-streaming media stream, the respective block of media segments in long-term memory that is separate and distinct from memory at the server. For example, as noted above, long-term storage can be utilized as supplemental storage. In some embodiments, long-term storage is slower but cheaper than server space. Accordingly, the long-term storage can store all of the media blocks, and the server can load media blocks from the long-term storage as needed, as discussed herein.

For example, in some embodiments, the server is used to store only media blocks that are currently being streamed to user devices. In another embodiment, the server stores only currently-streaming media blocks and media blocks immediately subsequent to said media blocks. This requires more storage space at the server, but it decreases stream buffer time because the server does not need to load the next media block in a media stream after streaming the media block immediately prior to said media block.

In some embodiments, the server is a server in a content distribution network (CDN). For example, many streaming services use CDNs to provide fast delivery of media across a geographically large amount of area.

In some embodiments, the method 200 includes receiving (203), from a respective user device of a plurality of user devices, a request to navigate (e.g., as illustrated by arrow 162 of FIGS. 1B-1D) from a current time of the media stream to a requested time of the media (e.g., as illustrated by the change in position of cursor 112 between FIG. 1A and FIG. 1B). For example, the request to navigate may be a user-initiated request to navigate (e.g., by repositioning the cursor 112 on the scrubber bar 111, by selecting one of the rewind button 113, the skip-back button 114, the skip-forward button 116, or the fast-forward button 117). As another example, the request to navigate may be a request to navigate generated by virtue of the user device 101 naturally transitioning from one media block to the next media block—such as while playing or streaming through one media block and into the next media block in the media stream.

In some embodiments, the requested time of the media stream is an earlier time of the media stream relative to the current time of the media stream. For example, referring to FIGS. 1A-1D, if the user drags the cursor 112 to the left or selects the rewind button 113 or the skip-back button 114, the requested time may be an earlier time relative to the current time.

In other embodiments, the requested time of the media stream is a later time of the media stream relative to the current time of the media stream. For example, referring to FIGS. 1A-1D, if the user drags the cursor 112 to the right or selects the skip-forward button 116 or the fast-forward button 117, the requested time may be a later time relative to the current time.

As further illustrated in FIG. 2A, in some embodiments, the method 200 includes determining (204) whether a block of media segments that have a time interval that overlaps with the requested time of the media stream is stored at the server. For example, in some embodiments, the media block that contains the requested time of the media stream is not stored at the server and is instead stored in long-term memory. This may be because media contained within the media block is not currently streaming or because it has not streamed for an extended amount of time. Accordingly, prior to the server streaming the requested media to the user device, in some embodiments, the server must first determine whether said media (e.g., media block, media segment, etc.) is already stored at the server.

In some embodiments, the method 200 includes retrieving (205) the block of media segments from long term memory in accordance with a determination that the block of media segments that have a time interval that overlaps with the requested time of the media stream is not stored at the server (e.g., as illustrated by arrows 163 and 164 of FIG. 1D).

In some embodiments, retrieving the block of media segments from long-term memory includes removing or deprecating, in accordance with a determination that there is not sufficient free space in the server for storage of the media segment, a pre-stored block of media segments. In some embodiments, a timer associated with the pre-stored block of media segments will expire before any other timer associated with respective other blocks of media segments stored in the server. In some embodiments, the respective timers of the respective media blocks stored in the server are used to determine which of the media blocks were accessed most recently.

In some embodiments, the method 200 includes quantizing, prior to retrieving the block of media segments from long-term memory, the requested time into a particular unit of time, wherein each unit of quantized time corresponds to a time interval for the blocks of media segments. In some embodiments, the method 200 includes determining, prior to retrieving the block of media segments from long-term memory, whether a block of media segments that have a time interval that corresponds to the particular unit of time is stored at the server.

As illustrated in FIG. 2B, in some embodiments, the method 200 includes foregoing (206) retrieving the block of media segments from long term memory in accordance with a determination that the block of media segments that have a time interval that overlaps with the requested time of the media stream is stored at short-term memory at the server. For example, if the block of media segments that have a time interval that overlaps with the requested time of the media stream is stored at the server, there is no need to load the block of media segments (i.e., the media block) from the long-term storage. Instead, in some embodiments, the server 130 can immediately begin streaming to the user device 101 from the requested time in the media stream 131 (e.g., the media segment that corresponds with the requested time in the media stream 131).

In some embodiments, the method 200 includes traversing (207) the block of media segments that have a time interval that overlaps with the requested time of the media stream to seek and identify a media segment corresponding to the requested time of the media stream. In some embodiments, the traversing step is performed at the server (e.g., server 130) rather than long term memory (e.g., long-term memory 150) for a particular media stream (e.g., media stream 131). For example, as discussed above with respect to FIGS. 1A-1D, in some embodiments, each media stream 131 may comprise one or more media blocks. Accordingly, in some embodiments, locating the specific media segment that corresponds to the requested time of the media stream at the server rather than long term memory allows for a more accurate seek experience for the user operating the user device.

In some embodiments, the method 200 includes streaming (208) a media stream to the user device that begins at the media segment corresponding to the requested time of the media stream. For example, in some embodiments, the requested time is two minutes and ten seconds. In some embodiments, the requested time corresponds to a media segment that begins at two minutes and six seconds. In some embodiments, the server begins the adjusted media stream at two minutes and six seconds (e.g., at the beginning of the media segment). In other embodiments, the server begins the adjusted media stream at two minutes and ten seconds (e.g., in the middle of the media segment).

In some embodiments, the method 200 includes determining whether a respective media segment temporally subsequent to a currently-streaming media segment is stored at the server. In accordance with a determination that the respective media segment temporally subsequent to the currently-streaming media segment is not stored at the server, in some embodiments, the method 200 further includes retrieving a block of media segments that includes the temporally subsequent respective media segment from long-term memory.

In some embodiments, the method 200 includes determining whether a respective block of media segments that is not currently streaming to a respective user meets deprecation criteria. In response to a determination that the respective block of media segments meets the deprecation criteria, in some embodiments, the method 200 further includes removing the respective block of media segments from the server. For example, server space may be limited. In order to manage said space, in some embodiments, the server will remove blocks of media segments that are not currently being streamed (or that have not been streamed for a predetermined amount of time).

In some embodiments, determining whether a respective block of media segments that is not currently streaming to a respective user meets deprecation criteria includes applying a criterion that is met when a previously initiated timer associated with the respective block of media segments expires after a predetermined amount of time since any media segments of the block of media segments was streamed to a respective user. For example, in some embodiments, each media block is associated with a timer that is set when the media block is initially loaded into the server and reset whenever the server streams the media block to a user device.

In some embodiments, the predetermined amount of time is based on a total length of media segments of the respective block of media segments. For example, the predetermined amount of time for a ten-hour media block may be greater than the predetermined amount of time for a ten-minute media block. In some embodiments, this is because the media block may be removed from the server upon the expiration of the predetermined amount of time. Accordingly, in some embodiments, the predetermined amount of time is at least as long as the total length of the media segments of the media block (e.g., ten minutes, ten hours, etc.).

In some embodiments, the method 200 includes displaying an indication of the current time of the media stream at the respective user device. For example, in FIGS. 1A-1D, the display 110 of the user device 101 displays an indication of the current time of the media stream with the cursor 112 and the scrubber bar 111. In some embodiments, the method 200 includes displaying an option to navigate from the current time of the media stream to another portion of the media stream. For example, as discussed above with respect to FIG. 1A, the display 110 of the user device 101 includes controls (e.g., cursor 112, skip-back button 114, skip-forward button 116, etc.) that allow a user to navigate from the current time of the media stream to another portion of the media stream.

In some embodiments, the method 200 includes performing any of the aforementioned steps while simultaneously receiving and streaming (e.g., at a server) a plurality of media streams to the plurality of user devices. In some embodiments, each respective media stream of the plurality of media streams comprises a plurality of media segments, and each media segment corresponds to a time-divided portion of a respective media stream.

It will be appreciated by those skilled in the art that changes could be made to the exemplary embodiments shown and described above without departing from the broad inventive concepts thereof. It is understood, therefore, that this invention is not limited to the exemplary embodiments shown and described, but is intended to cover modifications within the spirit and scope of the present invention as defined by the claims. For example, specific features of the exemplary embodiments may or may not be part of the claimed invention, and various features of the disclosed embodiments may be combined. Unless specifically set forth herein, the terms "a," "an" and "the" are not limited to one element but instead should be read as meaning "at least one."

It is to be understood that at least some of the figures and descriptions of the invention have been simplified to focus on elements that are relevant for a clear understanding of the invention, while eliminating, for purposes of clarity, other elements that those of ordinary skill in the art will appreciate may also comprise a portion of the invention. However, because such elements are well known in the art, and because they do not necessarily facilitate a better understanding of the invention, a description of such elements is not provided herein.

Further, to the extent that the methods of the present invention do not rely on the particular order of steps set forth herein, the particular order of the steps should not be construed as limitation on the claims. Any claims directed to the methods of the present invention should not be limited to the performance of their steps in the order written, and one skilled in the art can readily appreciate that the steps may be varied and still remain within the spirit and scope of the present invention.

What is claimed is:

1. A method of storing streaming media, comprising:
   at a server, while simultaneously receiving and streaming a plurality of media streams to a plurality of user devices, wherein each respective media stream of the plurality of media streams comprises a plurality of media segments, and each media segment corresponds to a time-divided portion of a respective media stream:
   grouping subsets of temporally adjacent media segments for each media stream of the plurality of media streams into blocks of media segments, each block of media segments corresponding to a time interval of the respective media stream;
   for each block of media segments having a time interval of a respective media stream that does not overlap with a time of a currently-streaming media stream, storing a respective block of media segments in long-term memory that is separate and distinct from memory at the server;
   receiving, from a respective user device of the plurality of user devices, a request to navigate from a current time of a media stream to a requested time of the media stream;
   determining whether a block of media segments that have a time interval that overlaps with the requested time of the media stream is stored at the server;
   in accordance with a determination that the block of media segments that have a time interval that overlaps with the requested time of the media stream is not stored at the server:
      retrieving the block of media segments from long-term memory;
   in accordance with a determination that the block of media segments that have a time interval that overlaps with the requested time of the media stream is stored at short-term memory at the server:
      foregoing retrieving the block of media segments from long-term memory, and
      traversing the block of media segments that have a time interval that overlaps with the requested time of the media stream to seek and identify a media segment corresponding to the requested time of the media stream; and streaming a media stream to the user device that begins at the media segment corresponding to the requested time of the media stream.

2. The method of claim 1, further comprising, prior to retrieving the block of media segments from long-term memory:
quantizing the requested time into a particular unit of time, wherein each unit of quantized time corresponds to a time interval for the blocks of media segments; and
determining whether a block of media segments that have a time interval that corresponds to the particular unit of time is stored at the server.

3. The method of claim 1, further comprising:
determining whether a respective media segment temporally subsequent to a currently-streaming media segment is stored at the server; and
in accordance with a determination that the respective media segment temporally subsequent to the currently-streaming media segment is not stored at the server, retrieving a block of media segments that includes the temporally subsequent respective media segment from long-term memory.

4. The method of claim 1, further comprising:
determining whether a respective block of media segments that is not currently streaming to a respective user meets deprecation criteria, and in response to a determination that the respective block of media segments meets the deprecation criteria, removing the respective block of media segments from the server.

5. The method of claim 4, wherein determining whether a respective block of media segments that is not currently streaming to a respective user meets deprecation criteria includes applying a criterion that is met when a previously initiated timer associated with the respective block of media segments expires after a predetermined amount of time since any media segments of the block of media segments was streamed to a respective user.

6. The method of claim 5, wherein the predetermined amount of time is based on a total length of media segments of the respective block of media segments.

7. The method of claim 1, wherein each media segment of the plurality of media segments is of a same length.

8. The method of claim 1, wherein each media segment of the plurality of media segments is no more than ten seconds long.

9. The method of claims 1, wherein each media segment of the plurality of media segments is of a same size.

10. The method of any of claim 1, further comprising:
displaying, at the respective user device, an indication of the current time of the media stream; and
displaying, at the user device, an option to navigate from the current time of the media stream to another portion of the media stream.

11. The method of claim 1, wherein retrieving the block of media segments from long-term memory comprises:
removing, in accordance with a determination that there is not sufficient free space in the server for storage of the media segment, a pre-stored block of media segments, wherein a timer associated with the pre-stored block of media segments will expire before any other timer associated with respective other blocks of media segments stored in the server.

12. The method of claim 1, wherein the server comprises a server in a content distribution network (CDN).

13. The method of claim 1, wherein the requested time of the media stream comprises an earlier time of the media stream relative to the current time of the media stream.

14. The method of claim 1, wherein the requested time of the media stream comprises a later time of the media stream relative to the current time of the media stream.

15. The method of claim 1, wherein the media stream comprises audio media.

16. The method of claim 1, wherein the media stream comprises video media.

17. The method of claim 1, wherein the media stream comprises a live stream.

18. An electronic device, comprising:
one or more processors; and
memory storing one or more programs, the one or more programs including instructions, which, when executed by the one or more processors, cause the electronic device to perform the method of claim 1.

19. A non-transitory, computer-readable medium, storing one or more programs, the one or more programs including instructions, which, when executed by one or more processors of an electronic device, cause the electronic device to perform the method of claim 1.

\* \* \* \* \*